(12) United States Patent  (10) Patent No.: US 8,364,213 B2
Choi  (45) Date of Patent: Jan. 29, 2013

(54) MOBILE TERMINAL

(75) Inventor: Seong-Woo Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 12/773,755

(22) Filed: May 4, 2010

(65) Prior Publication Data

US 2011/0096476 A1    Apr. 28, 2011

(30) Foreign Application Priority Data

Oct. 28, 2009  (KR) .......................... 10-2009-0103048

(51) Int. Cl.
*H05K 5/00*  (2006.01)
*H05K 7/00*  (2006.01)
*H04M 1/00*  (2006.01)

(52) U.S. Cl. ............. 455/575.1; 455/575.4; 361/679.27; 361/679.3; 361/679.55; 361/679.56

(58) Field of Classification Search ............. 361/679.27, 361/679.3, 679.55, 679.56; 455/575.1, 575.4
See application file for complete search history.

(56) References Cited

U.S. PATENT DOCUMENTS

| 2001/0053674 | A1* | 12/2001 | Katoh | ............................ 455/90 |
| 2005/0037821 | A1* | 2/2005 | Takagi | ....................... 455/575.3 |
| 2008/0026802 | A1 | 1/2008 | Carlson | |
| 2009/0061963 | A1* | 3/2009 | Miyaoka | .................... 455/575.4 |
| 2009/0280874 | A1* | 11/2009 | Kosugi et al. | .............. 455/575.3 |

* cited by examiner

*Primary Examiner* — Anthony Haughton
(74) *Attorney, Agent, or Firm* — Lee, Hong, Degerman, Kang & Waimey

(57) ABSTRACT

Disclosed is a mobile terminal including, first and second bodies rotatably connected to each other, a rotation module connected to each of the first and second bodies, and configured to relatively rotate the first and second bodies based upon a rotational shaft, and a supporting unit disposed at the first body, and configured to come in contact with at least part of the second body at a spaced position from the rotation module so as to support the second body, the supporting unit being rotated by the contact upon the rotation of the second body.

19 Claims, 7 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2009-0103048, filed on Oct. 28, 2009, the contents of which is incorporated by reference herein in its entirety.

BACKGROUND OF THE INVENTION

1. Field of the Invention

The present invention relates to a mobile terminal having one body relatively rotatable with respect to another body.

2. Background of the Invention

Terminals may be divided into mobile/portable terminals and stationary terminals according to their mobility. Also, the portable terminals may be categorized into a handheld terminal and a vehicle mount terminal according to whether it is directly portable by a user.

As it becomes multifunctional, the portable terminal can be allowed to capture still images or moving images, play music or video files, play games, receive broadcast and the like, so as to be implemented as an integrated multimedia player.

Various new attempts have been made for the multimedia devices by hardware or software in order to implement such complicated functions. For example, a user interface environment is provided in order for users to easily and conveniently retrieve or select functions.

In addition to the attempts, approaches for more improving functions of the hardware or providing a new user interface may be considered.

SUMMARY OF THE INVENTION

Therefore, an object of the present invention is to provide a mobile terminal having bodies which are rotatably coupled by a different mechanism from the related art.

Another object of the present invention is to provide a mobile terminal capable of more enhancing the performance of a relative rotation of bodies.

To achieve these and other advantages and in accordance with the purpose of the present invention, as embodied and broadly described herein, there is provided a mobile terminal including, first and second bodies rotatably connected to each other, a rotation module connected to each of the first and second bodies, and configured to relatively rotate the first and second bodies based upon a rotational shaft, and a supporting unit disposed at the first body, and configured to come in contact with at least part of the second body at a spaced position from the rotation module so as to support the second body, the supporting unit being rotated by the contact upon the rotation of the second body.

According to one example of the present invention, the rotation module may configure a cantilever in a coupled state to the first body. The cantilever may include a fixed end and a free end. The fixed end may be coupled to the first body, and the free end may be formed to be relatively rotatable with respect to the fixed end based upon the rotational shaft, and coupled to the second body.

According to another example of the present invention, the first and second bodies may respectively include front surfaces, side surfaces and connection units. The front surfaces may face each other in a closed configuration, in which the first and second bodies overlaid with each other. The side surfaces may be formed in an intersecting direction with the front surfaces, connected to each other by virtue of the rotation module. The connection units may be formed at the side surfaces such that both ends of the rotation module are mounted thereto, respectively. A display unit for displaying visual information may be disposed on at least one of the front surfaces. The display unit may be configured such that a length in a direction in parallel to the rotational shaft is longer than a length in a direction intersecting with the rotational shaft.

According to another example of the present invention, at least one of the connection units may include a body and an insertion groove. The body may protrude from the side surface, and at least part of the body may be in a circular form. The insertion groove may be recessed into the body in a direction of the rotational shaft, and configured to insert the rotational shaft therein. The supporting unit may be disposed at the side surface so as to support the body.

According to another example of the present invention, a side surface of the first body may be curved to correspond to an outer circumference of the connection unit of the second body, and the supporting unit may be disposed at the side surface of the first body.

According to another example of the present invention, the supporting unit may be configured to linearly contact or point-contact at least part of the second body. The supporting unit may include a roller and a roller shaft. The roller may contact at least part of the second body, and the roller shaft may be rotatably installed at the first body so as to rotate the roller. The supporting unit may include a ball and a ball casing. The ball may contact at least part of the second body, and the ball casing may be provided at the first body to cover the ball such that the ball rotates in place.

According to another example of the present invention, the rotation module may include first and second brackets and lubrication members. The first bracket may be disposed at the first body and configured to insert the rotational shaft therein. The second bracket may be disposed at the second body and configured to insert the rotational shaft therethrough. Also, the lubrication members may be disposed at an outer circumference of the rotational shaft and configured to fill a gap between the rotational shaft and the first bracket. The lubrication members may be provided in plurality, and the plurality of lubrication members may be disposed at positions spaced apart from each other to be adjacent to both ends of the rotation shaft. The second bracket may include a coupling unit formed in a direction intersecting with the rotational shaft and coupled to the second body.

According to another example of the present invention, the first and second bodies may include front surfaces, side surfaces and connection units. The front surfaces may face each other in a closed configuration, in which the first and second bodies overlaid with each other. The side surfaces may be formed in an intersecting direction with the front surfaces, and connected to each other by virtue of the rotation module. The connection units may be formed at the side surfaces such that the first or second bracket is mounted thereto. The connection unit of the first body may be in the form of a hollow body such that the first bracket is inserted therein. A filling member may be provided between the connection unit of the first body and the first bracket, so as to wrap up an outer circumference of the first bracket, thus filling a spaced gap between the connection unit of the first body and the first bracket. The first bracket may have one end open and another end blocked, and at least one of the connection unit of the first body and the filling member may be provided with a through hole to which the another end of the first bracket is coupled.

To achieve the objects of the present invention in accordance with another embodiment of the present invention, there is provided a mobile terminal including first and second bodies rotatably coupled to each other, a rotation module having one end connected to the first body and another end coupled to the second body, the rotation module being rotatable between the both ends, and a supporting unit disposed at one of the first and second bodies and configured to support another one of the first and second bodies at a position outside a region occupied by the rotation module, the supporting unit rotating in an opposite direction to the rotation of the another one of the first and second bodies so as to keep supporting the another one of the first and second bodies.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
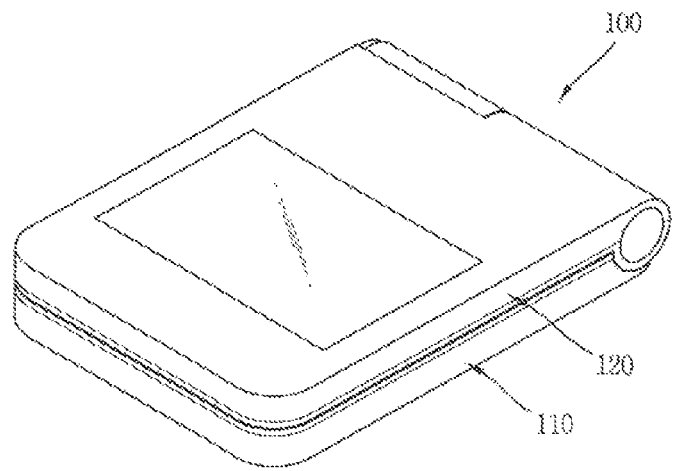
FIG. 1 is a perspective view illustrating a closed configuration of a mobile terminal in accordance with one embodiment of the present invention.

Description will now be given in detail of a portable terminal according to the present invention, with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

Description will now be given in detail of an expansion module and a mobile electronic device having the same according to the present invention, with reference to the accompanying drawings. This specification employs like/similar reference numerals for like/similar components irrespective of different embodiments, so they all will be understood by the first description.

Figure 2:
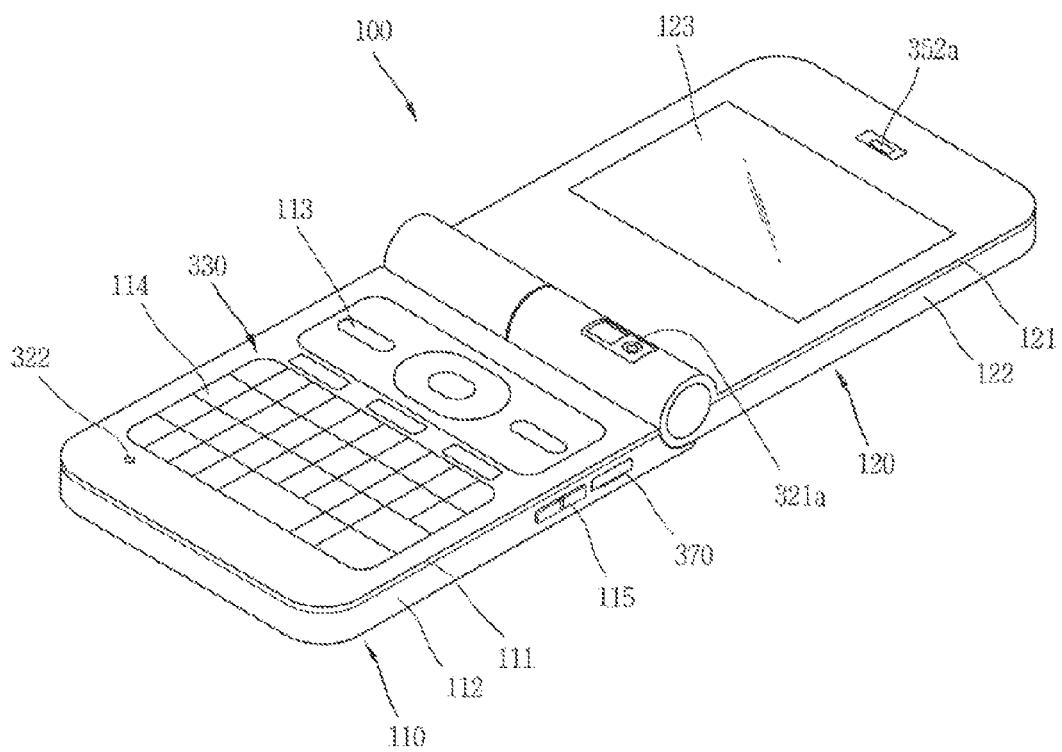
FIG. 2 is a perspective view of an open configuration of the mobile terminal shown in FIG. 1.

FIGS. 1 and 2 are perspective view of a mobile terminal in accordance with the present invention. FIG. 1 shows a closed configuration of a mobile terminal 100, and FIG. 2 shows an open configuration of the mobile terminal 100.

As shown in FIGS. 1 and 2, a mobile terminal 100 may include a first body 110 and a second body 120 having at least one side folderable or unfoldable with respect to the first body 110. The mobile terminal 100 illustrated in FIGS. 1 and 2 exemplarily especially shows a folder type mobile terminal; however, the mobile terminal according to the present invention may not be limited to the folder type, but rather be applicable to various types, such as a flip type and the like.

As shown in FIG. 1, if the first body 110 and the second body 120 are overlaid, namely, overlapped on each other, this state may be referred to as 'closed configuration.' In the closed configuration, the first and second bodies 110 and 120 may be disposed to face each other. Hereinafter, portions of the first and second bodies 110 and 120 facing each other in the closed configuration are referred to as front surfaces of the first and second bodies 110 and 120. As shown in FIG. 2, if the first and the second bodies 110 and 120 are relatively rotated away from each other, this state may be referred to as 'open configuration.' Also, portions formed in a direction intersecting with the front surfaces are referred to as side surfaces.

The mobile terminal normally operates in a standby mode in the closed configuration but such standby mode may be released by a user's manipulation. The mobile terminal 100 may be operable in a communication mode and the like in the open configuration, but it be converted into the standby mode according to the user's manipulation or after a preset time elapses.

Functions or components to be disposed at each one surface of the first and second bodies 110 and 120 may be determined in various manners depending on which functions are emphasized in the mobile terminal 100 or what kind of user interfaces are pursued. As one example, a display unit 123, as shown in FIG. 2, may be disposed on one surface of the second body 120 and a user input unit 330 may be disposed on one surface of the first body 110. Hereinafter, the one surfaces of the first and second bodies 110 and 120 having the first and second display units 113 and 123, respectively, may be preferred to as upper surfaces. Hereinafter, one surfaces of the first and second bodies 110 and 120 having the user input unit 330 and the display unit 123 may be referred to as front surfaces.

Referring to FIG. 2, a case (housing, casing, cover, etc.) forming the outside of the first body 110 is formed by a front case 111 and a rear case 112. In addition, various electronic components may be disposed in a space between the front case 111 and the rear case 112. At least one intermediate case may additionally be disposed between the front case 111 and the rear case 112. Further, the cases can be formed of resin in a manner of injection molding, or formed using metallic materials such as stainless steel (STS) and titanium (Ti).

Similar to the first body 110, a front case 121 and a rear case 122 may configure the second body 120.

A display unit 123, a user input unit 330, a first audio output module 352a, a first camera 321a and a microphone 322 may be disposed at the first and second bodies 110 and 120.

In detail, the front case 111 of the first body 110 and the front case 121 of the second body 120 are shown having the display unit 123, the first audio output module 352a, the first camera 321a and the microphone 322.

Upon a relative rotation between the first and second bodies 110 and 120, the user input unit 330 and the display unit 123, which are located on the overlapped front surfaces of the first and second bodies 110 and 120 in the closed configuration (see FIG. 1), are externally exposed. Here, the present invention may not be limited to this structure. Alternatively, the user input unit 330 may be replaced with an auxiliary display unit. In this alternative case, the display unit 123 and the auxiliary display unit may serve as a dual display which displays one image information via a plurality of regions.

The display unit 123 may be configured to display visible information, examples of which include a liquid crystal display (LCD) module, an organic light emitting diodes (OLED) module, a transparent OLED (TOLED) and the like.

The display unit 123 may further include a touch screen so as to allow a user to perform a touch input. For a call connection, the display unit 123 may output numeral keys which are touchable for input.

The display unit 123 may be configured to generate various tactile effects which a user can feel upon a touch input. Such function can be implemented by employing a haptic module cooperating with the display unit 123. The haptic module can generate tactile effects, representatively, a vibration. Such haptic module may differently be disposed depending on the configuration of the mobile terminal 100 as well as the configuration of the display unit 123.

For example, the user input unit 330 can be implemented as a dome switch or touchpad which can receive information or commands input by a user in a pushing or touching manner, or implemented in a manner of using a wheel, a jog or a joystick to rotate keys.

Contents input via a first or second manipulation unit 113 or 114 may be variously set. For example, the first manipulation unit 113 can be used for inputting commands such as START, END, SCROLL and the like, and the second manipulation unit 114 can function for inputting numbers, characters, symbols or the like.

The first audio output module 352a may be configured as a receiver or a speaker. The first camera 321a may be a camera module for allowing a user to capture images or video. The microphone 322 may be disposed symmetrical to the first audio output module 352a based upon the display unit 123.

Referring to the drawings, a third manipulation unit 115, an interface unit 370 and the like may be disposed on one side surface of the first body 110.

The third manipulation unit 125 can function as a hot key for activating a specific function, such as activation of the first camera 321a. The third manipulation unit 125 may configured the user input unit 330 together with the first or second manipulation unit 113 or 114.

The interface unit 370 may interface the mobile terminal 100 and external devices so as to allow data exchange therebetween or the like. For example, the interface unit 370 may be at least one of a wired/wireless access terminal for earphones, a short-range communication port (e.g., IrDA port, BLUETOOTH port, wireless Lan port, and the like), and power supply terminals for supplying power to the mobile terminal.

The interface unit 370 may be a card socket for accommodating an external card such as Subscriber Identification Module (SIM), User Identity Module (UIM), memory card for storing information, or the like.

A broadcast signal receiving antenna in addition to an antenna for communication may be disposed at one side of the bodies 110 and 120. The antenna may be retractable into one of the bodies 110 and 120.

Figure 3:
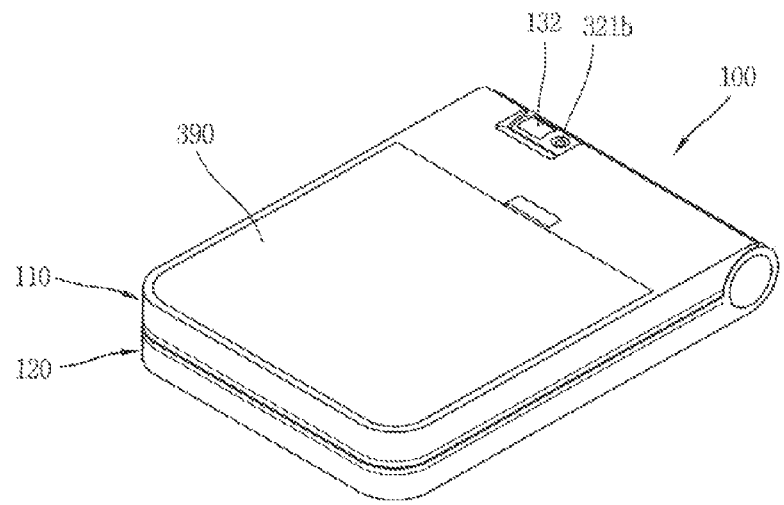
FIG. 3 is a rear perspective view of the mobile terminal shown in FIG. 1.

FIG. 3 is a rear perspective view of the mobile terminal 100 of FIG. 1.

A power supply unit 390 for supplying power to the mobile terminal 100 may be mounted to the second body 120. The power supply unit 390 may be a rechargeable battery, for example, which is attachable or detachable for charging.

A second camera 321b may further be disposed at the rear case 112 of the first body 110. The second camera 321b faces a direction which is substantially opposite to a direction faced by the first camera 321a (see FIG. 1). Also, the second camera 321b may be a camera having different pixels from those of the first camera 321a.

For instance, the first camera 321a may operate with relatively lower pixels (lower resolution). Thus, the first camera 321a may be useful when a user can capture his face and send it to another party during a video call or the like. On the other hand, the second camera 321b may operate with relatively higher pixels (higher resolution) such that it can be useful for a user to obtain higher quality pictures for later use.

A flash 132 and a mirror (not shown) may be disposed adjacent to the second camera 321b. The flash 132 operates in conjunction with the second camera 321b when taking a picture using the second camera 321b. The mirror can cooperate with the second camera 321b to allow a user to photograph himself in a self-portrait mode.

A second audio output module may further be disposed at the rear case 122.

The second audio output module can cooperate with the first audio output module 352a (see FIG. 1) to provide stereo output. Also, the second audio output module may be configured to operate as a speakerphone.

As described above, it has been described that the second camera 321b is disposed at the rear case 112; however, the present invention may not be limited to the configuration. It is also possible that one or more of those components (e.g., 131 to 134), which have been described to be implemented on the rear case 112, such as the second camera 321b, will be implemented on the second body 120, particularly, on the rear case 122. In addition, without the second camera 321b, the first camera 321a can be implemented to be rotatable so as to rotate up to a direction which the second camera 321b faces.

Figure 4:
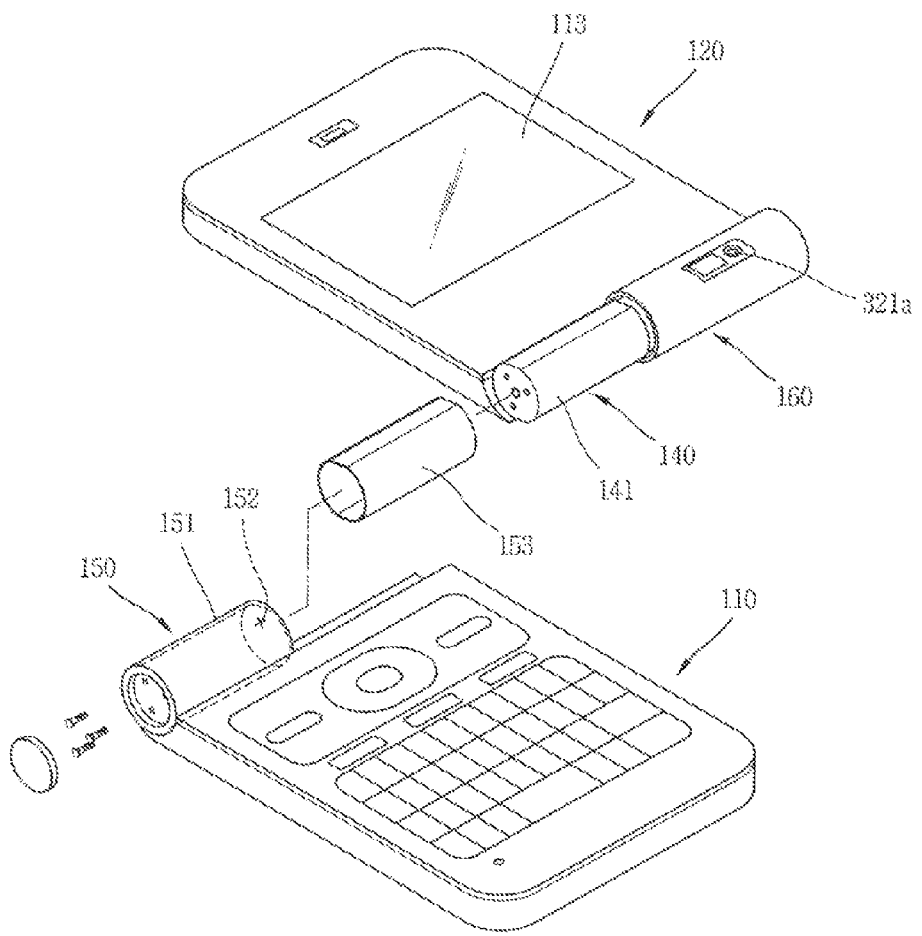
FIG. 4 is a disassembled perspective view of the mobile terminal shown in FIG. 2.

The first and second bodies 110 and 120 may be rotatably coupled to each other by virtue of a rotation module 140 (see FIG. 4). The rotation module 140 may be configured to allow a relative rotation of the first and second bodies 110 and 120 between the closed configuration and the open configuration. Referring to the drawings, the rotation module 140 may be disposed at side surfaces of the first and second bodies 110 and 120, in detail, at side surfaces thereof facing each other in the open configuration.

Figure 5:
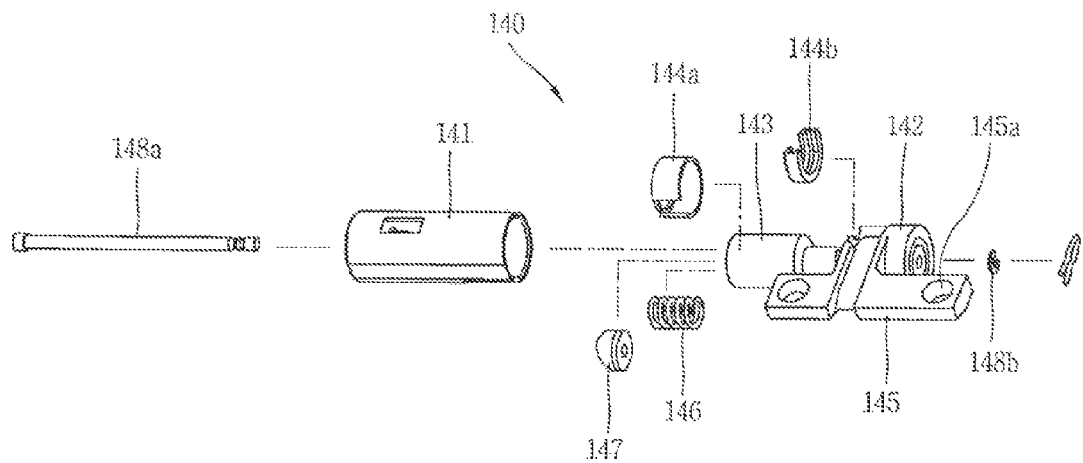
FIG. 5 is a disassembled perspective view of a rotation module shown in FIG. 4.

FIG. 4 is a disassembled perspective view of the mobile terminal 100 of FIG. 2, and FIG. 5 is a disassembled perspective view of the rotation module 140 of FIG. 4.

As shown in FIGS. 4 and 5, the rotation module 140 may be connected to the first and second bodies 110 and 120 so as to render the first and second bodies 110 and 120 relatively rotated based upon a rotational shaft 143. Accordingly, the first and second bodies 110 and 120 may be relatively rotatable between the closed configuration (see FIG. 1) and the open configuration (see FIG. 2).

Referring to FIG. 4, one end of the rotation module 140 may be connected to the first body 110 and another end thereof may be connected to the second body 120. In detail, both ends of the rotation module 140 may be connected to side surfaces of the first and second bodies 110 and 120, respectively, and the rotation module 140 may be configured to be rotatable between the both ends. That is, the side surfaces of the first and second bodies 110 and 120 may be connected by the rotation module 140. However, the present invention may not be limited to the structure. For example, the another end of the rotation module 140 may be connected to the first body 110 and the one end thereof may be connected to the second body 120.

Referring to FIG. 5, the rotation module 140 may include a first bracket 141, a second bracket 142, a rotational shaft 143 and lubrication members 144*a* and 144*b*.

The first bracket 141 may be mounted to the first body 110, and formed to insert the rotational shaft 143 thereinto. The first bracket 141 may be formed such that one end is open and another end is closed, and the rotational shaft 143 may be inserted into the opening. That is, an outer appearance of the first bracket 141 may be in the form of a hollow tube. Also, as mentioned above, the one end of the rotation module 140 connected to the first body 110 may become a part of the first bracket 141.

The rotational shaft 143 may have a hollow body and protrude from the second bracket 142 in the form of a cantilever. The second bracket 142 may be formed in the form of a hollow tube having one side blocked, and an open side thereof may be connected to the rotational shaft 143. The another end of the rotation module 140 connected to the second body 120 may become a coupling unit 145 of the second bracket 142.

The coupling unit 145 may be formed in an intersecting direction with a shaft direction of the rotational shaft 143 at a cylindrical outer circumference. The coupling unit 145 may be in the form of a plate, and a principal surface of the coupling unit 145 is shown having through holes 145*a* for allowing coupling to the second body 120.

A spring 146 and a second cam 147 may be inserted into the rotational shaft 143. The fixing shaft 148*a* may be inserted through the second cam 147 and the spring 146 so as to be coupled to the blocked portion of the second bracket 142. For the coupling of the fixing shaft 148*a*, a through hole through which at least part of the fixing shaft 148*a* is inserted may be formed at the blocked portion of the second bracket 142, and a stopping ring 148*b* may be mounted to an outer circumference of the fixing shaft 148*a* inserted throughout the through hole.

A first cam (not shown) having a shape corresponding to the second cam 147 may be disposed within the first bracket 141. The first cam and the second cam 147 may be conformable to each other in shape, thus to generate resistance to the rotation of the rotational shaft 143.

Still referring to FIG. 5, the lubrication members 144*a* and 144*b* may be mounted to an outer circumference of the rotational shaft 143 so as to fill a gap between the rotational shaft 143 and the first bracket 141. The lubrication members 144*a* and 144*b* may be formed in a ring shape, made of polyoxymethylene (POM), for example. During rotation, the lubrication members 144*a* and 144*b* may produce a lubricated friction with the rotational shaft 143 or the first bracket 141. Here, the lubricated friction denotes friction occurred by the lubrication members 144*a* and 144*b*.

The lubrication members 144*a* and 144*b* may be provided in plurality. The plurality of lubrication members 144*a* and 144*b* may be mounted at positions spaced from each other to be adjacent to both ends of the rotational shaft 143. Accordingly, the lubrication members 144*a* and 144*b* may decrease the frictional force between the rotational shaft 143 and an inner circumference of the first bracket 141 and simultaneously restrict the rotational shaft 143 from moving (e.g., vibrating) within the first bracket 141.

Referring back to FIG. 4, connection units 150 and 160 to which both ends of the rotation module 140 are mounted may be formed at side surfaces of the first and second bodies 110 and 120.

At least one of the connection units 150 and 160 may have a hollow body whose outer appearance is in a circular form. For example, the first connection unit 150 formed at the side surface of the first body 110 may include a body 151 and an insertion groove 152.

The body 151 may protrude from the side surface of the first body 110 and be partially formed in a circular shape. The insertion groove 152 may be recessed from one side of the body 151 in a direction of the rotational shaft 143 such that the rotation module 140 is inserted therein. The second connection unit 160 formed at the second body 120 may have the same or similar structure to the first connection unit 150.

The first camera 321*a* may be disposed at the second connection unit 160. Most of outer circumferential surfaces of the first and second connection units 150 and 160 may be level with each other such that their outer appearances can cooperatively form one cylinder.

The first bracket 141 may be inserted into the first connection unit 150 having the hollow form. In detail, the blocked end portion of the first bracket 141 may be disposed adjacent to a bottom surface of the insertion groove 152 of the first connection unit 150.

A filling member 153, which wraps up the outer circumference of the first bracket 141, may be disposed between the first connection unit 150 and the first bracket 141 so as to seal the spaced gap therebetween. Consequently, the filling member 153 may restrict the vibration, shaking or the like of the first bracket 141 within the first connection unit 150. The filling member 153 may be formed like a ring or tube, made of POM, for example.

A through hole for allowing the coupling of the first bracket 141 may be formed through at least one of the first connection unit 150 and the filling member 153. In detail, a bracket through hole formed in the shaft direction may be disposed at the blocked end portion of the first bracket 141 and a through hole facing the bracket through hole may be formed at a bottom surface of the insertion groove 152 for allowing coupling of the first bracket 141. As such, as the rotation module 140 mounted to the second body 120 is coupled to the first body 110, the first and second bodies 110 and 120 can be rotatably coupled to each other.

Figure 6:
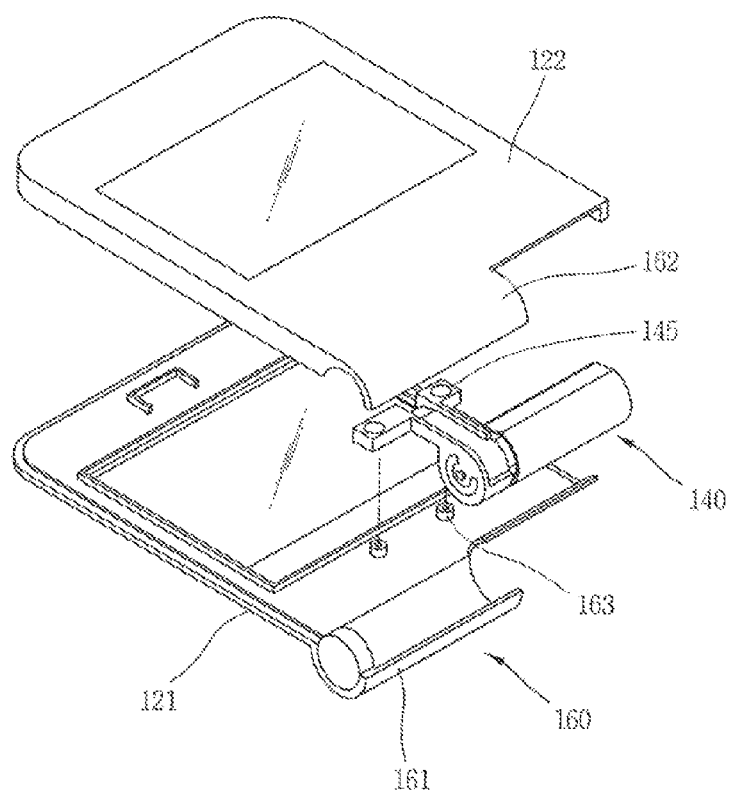
FIG. 6 is a perspective view illustrating a mechanism that the rotation module of FIG. 4 is mounted to a second body.

FIG. 6 is a perspective view illustrating a mechanism that the rotation module 140 of FIG. 4 is mounted to the second body 120.

As shown in FIG. 6, the second connection unit 160 may be configured such that the second bracket 142 of the rotation module 140 is disposed within an inner space defined by a front housing 161 and a rear housing 162. The front and rear housings 161 and 162 may form a body of the second connection unit 160 protruding from the side surface of the second body 120, and the defined inner space may form an insertion groove in which the rotation module 140 is inserted.

The front housing 161 may be integrated with the front case 121 of the second body 120, and the rear housing 162 may be integrated with the rear case 122 of the second body 120. An outer appearance configured by the front and rear housings 161 and 162 may be in the form of a hollow cylinder having one end open.

Mounting portions 163, to which the coupling unit 145 of the second bracket 142 is mounted, may be located at an adjacent portion to the front housing 161 of the front case 121, in detail, at a spaced position from an inner circumference of the front housing 161 in a radial direction. The mounting portions 163 may be covered by a principal surface of the coupling unit 145, and have coupling grooves corresponding to the through holes 145a of the coupling unit 145, accordingly, the coupling unit 145 can be coupled to the mounting portions 163 by bolts.

The rotational shaft 143 may be disposed in a shaft direction of the front housing 161. The first bracket 141 (see FIG. 5) in which the rotational shaft 143 is inserted may be inserted through the opening of the second connection unit 160 to protrude toward the first connection unit 150.

Figure 7A:
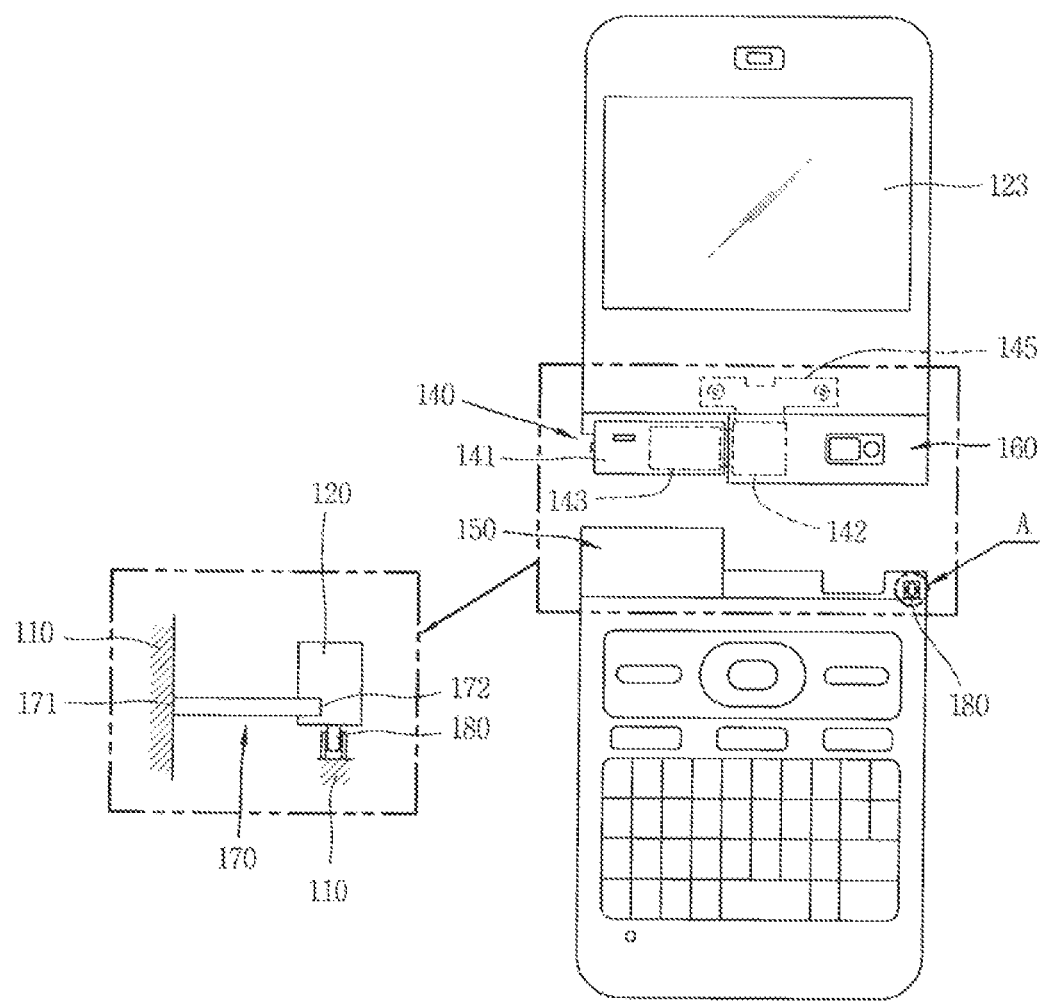
FIG. 7A is a front view of the mobile terminal of FIG. 4.

Hereinafter, a mechanism of configuring a cantilever by means of the rotation module 140 and the second body 120 will be described with reference to FIGS. 7A and 7B. FIG. 7A is a front view of the mobile terminal of FIG. 4, and FIG. 7B is an enlarged perspective view of part A of FIG. 7A.

Referring to FIG. 7A, the rotation module 140 may configure a cantilever 170 in a coupled state to the first body 110.

The cantilever 170 may include a fixed end 171 coupled to the first body 110, and a free end 172 configured to be relatively rotatable with respect to the fixed end 171 based upon the rotational shaft 143 and coupled to the second body 120. For example, the fixed end 171 may be the blocked end portion of the first bracket 141 connected to the first connection unit 150, and the free end 172 may be the coupling unit 145 of the second bracket 142 connected to the second connection unit 160.

Figure 7B:
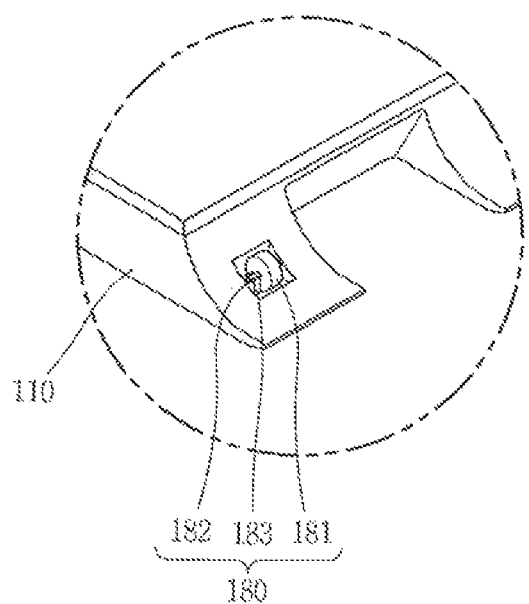
FIG. 7B is an enlarged perspective view of part A shown in FIG. 7A.

Referring to FIGS. 7A and 7B, a supporting unit 180 may be mounted at the first body 110. The supporting unit 180 may be provided to support a portion of the second body 120 adjacent to the free end 172. The supporting unit 180 may prevent the deformation, in detail, drooping of the free end 172. Here, the present invention may not be limited to the structure. Alternatively, the supporting unit 180 may be mounted at the second body 120 so as to support the first body 110.

The supporting unit 180 may come in contact with at least part of the second body 120 so as to support the second body 120 at a position spaced apart from the rotation module 140 along the rotational shaft 143 of the rotation module 140, and be configured to be rotated responsive to the contact when the second body 120 is rotated. The side surface of the first body 110 may be curved to correspond to the outer circumference of the second connection unit 160. The supporting unit 180 may be disposed at the side surface of the first body 110 so as to support the body of the second connection unit 160.

The supporting unit 180 may support the second body 120 at a position outside a region occupied by the rotation module 140, and rotate in an opposite direction to the second body 120 rotating so as to keep supporting the second body 120. The contact between the supporting unit 180 and the second body 120 may generate a frictional force against the rotation of the second body 120, and the supporting unit 180 is rotated due to the frictional force. Accordingly, vibration, loosing, twisting or the like of the first and second body 110 and 120, which may occur upon the relative rotation, can be alleviated or prevented.

Referring to the drawings, the display unit 123 for displaying visual information may be disposed at the front surface of the second body 120. The display unit 123 may be configured such that a length in a direction in parallel to the rotational shaft 143 of the rotation module 140 is longer than a length in a direction intersecting with the rotational shaft 143. Accordingly, an output direction of the display unit 123 may be a landscape direction having width longer than height. Consequently, it is possible to implement a design satisfying a user's desire who wants to watch a movie or the like through the display unit 123.

If a length of the side surface of the second body 120 at which the rotation module 140 is mounted becomes longer, it can facilitate implementation of the display unit 123 having width longer than height. The supporting unit 140 can alleviate or prevent drooping of the second body 120 which may occur at the spaced portion of the connected point between the first and second bodies 110 and 120, irrespective of lengthening of the side surface of the second body 120.

The supporting unit 180 may linearly contact or point-contact at least part of the second body 120. In detail, the supporting unit 180 may include a roller 181 and a roller shaft 182.

The roller 181 may come in contact with at least part of the second body 120, and be made of an elastic material, such as synthetic resin, rubber and the like. The roller shaft 182 may be rotatably mounted at the first body 110 so as to rotate the roller 181. A roller shaft holder 183 may be formed at the first body 110 so as to help the roller shaft 182 rotatably mounted thereto. The roller 180 may rotate in an opposite direction to the rotation of the second body 120 with maintaining a linear contact with an outer surface of the body of the second connection unit 160.

Figure 8A:
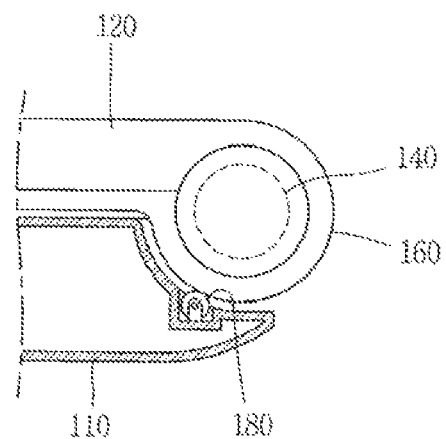
FIGS. 8A and 8B are side views of the mobile terminals in the states of FIG. 1 and FIG. 2, respectively.
Figure 8B:
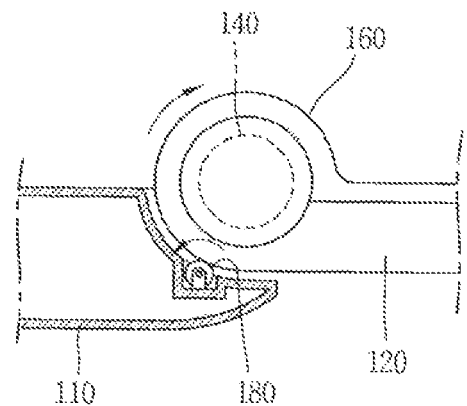

Hereinafter, an operation of the supporting unit 180 will be described with reference to FIGS. 8A and 8B. FIGS. 8A and 8B are side views of the mobile terminals shown in FIG. 1 and FIG. 2, respectively.

Referring to FIG. 8A, the rotation module 140 may connect the first and second bodies 110 and 120 such that an end portion of the second connection unit 160 becomes a free end in the closed configuration. At least part of the side surface of the first body 110 may be circular so as to be spaced apart from the second connection unit 160 by a preset interval.

The supporting unit 180 may protrude from the side surface of the first body 110 to support an end of the second connection unit 160.

Referring to FIG. 8B, as the second body 120 is relatively rotated with respect to the first body 110, the supporting unit 180 is cooperatively rotated with being kept in contact with the second connection unit 160. The spaced gap between the side surface of the first body 110 and the second connection unit 160 is maintained irrespective of the relative rotation of the second body 120, which results in decreasing or preventing abrasion of the outer appearance of the body.

Figure 9:
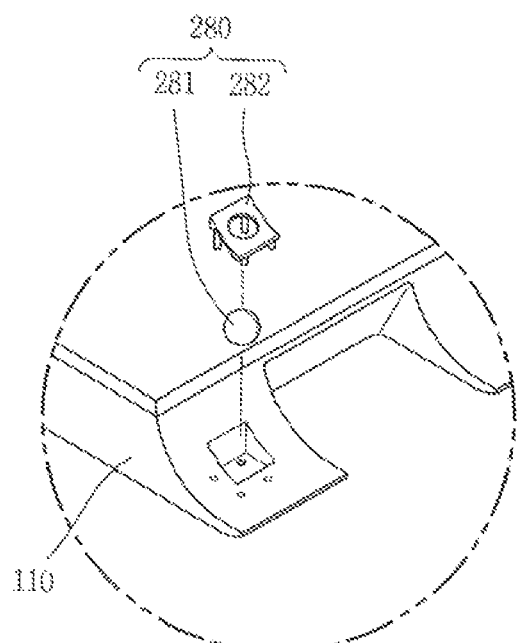
FIG. 9 is a disassembled view illustrating a variation of a supporting unit of FIG. 6.

FIG. 9 is a disassembled view illustrating a variation of the supporting unit of FIG. 6.

As shown in FIG. 9, a supporting unit 280 may include a ball 281 and a ball casing 282.

The ball 281 may come in contact with at least part of the second body 120 (see FIG. 7) so as to be rotated upon the rotation of the second body 120. The ball casing 282 may be provided at the first body 110 to cover the ball 281 such that the ball 281 can rotate in place. At least part of the ball casing 282 may be open such that the ball 281 is protruded through the opening, which allows the ball 281 to support the second body 120.

The ball 281 may be kept in point-contact with the second body 120, thereby more reducing a frictional force between the supporting unit 280 and the second body 120.

In the mobile terminal according to at least one embodiment of the present invention having such configurations, a supporting unit may be employed so as to relieve vibration, loosing, twisting or the like upon the relative rotation of first and second bodies. Accordingly, drooping of a body, which may occur at a spaced portion of a connected point between the bodies, can be reduced and also abrasion of an outer appearance of a body can be decreased or prevented.

Also, the present invention may employ a rotation module implemented as a cantilever and a supporting unit for restricting deformation of a free end of the cantilever, which makes a body longer in a horizontal direction, resulting in implementing a display unit having width longer than height.

Furthermore, the present invention may fill a gap between a rotational shaft and a bracket by use of lubrication members, thereby providing a rotation module in which vibration or shaking of the rotational shaft can be reduced as well as lowering a frictional force due to the rotation of the rotational shaft.

Figure 10:
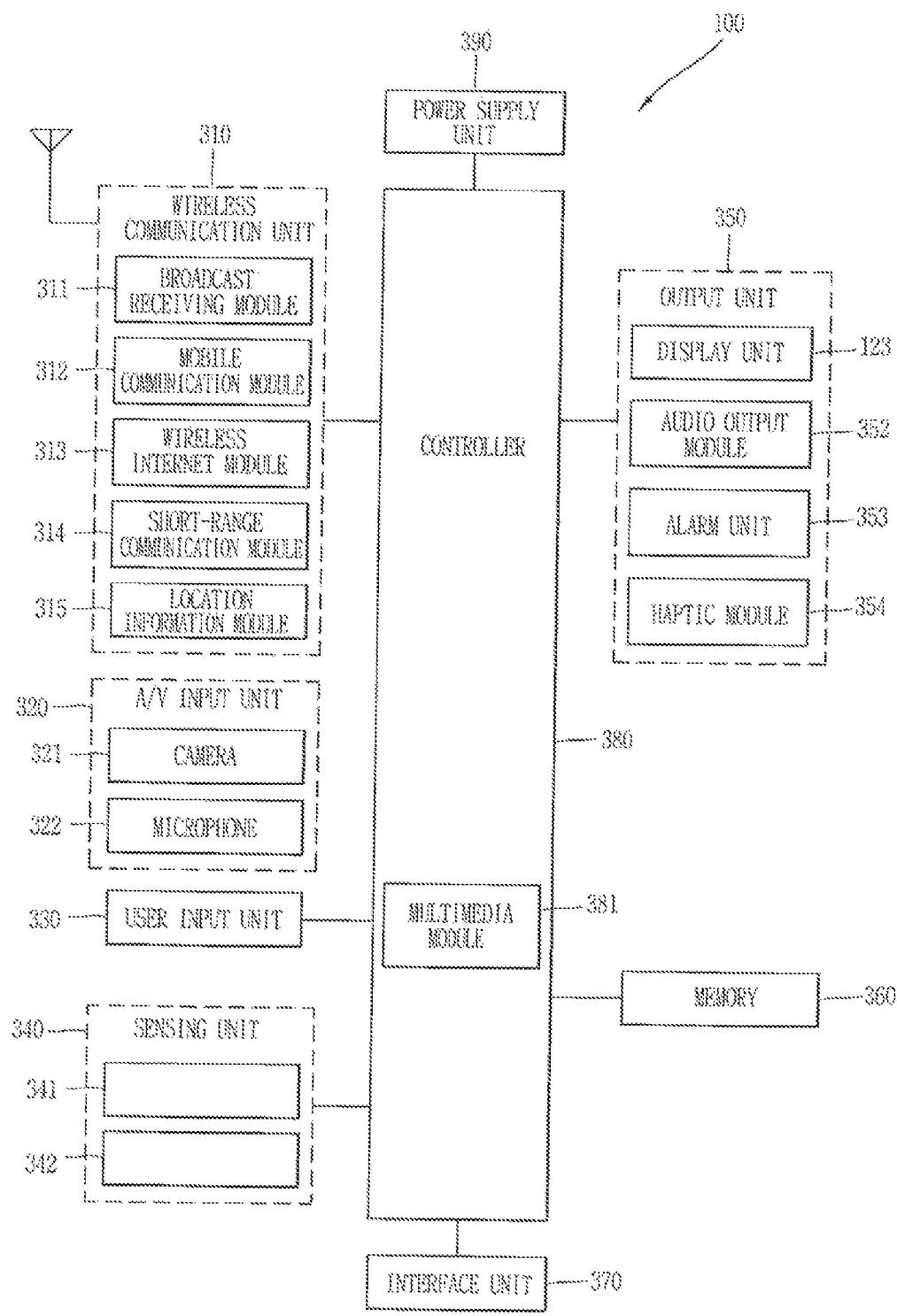
FIG. 10 is a block diagram of a mobile terminal in accordance with the present invention.

FIG. 10 is a block diagram of a mobile terminal in accordance with the present invention. Hereinafter, description will be given based upon the configuration of the mobile terminal 100 in accordance with the one embodiment of the present invention; however, the description can be applied to a mobile terminal 200 in accordance with another embodiment as it is, which will be fully inferred by a person skilled in the art.

Referring to FIG. 10, the mobile terminal 100 may include a wireless communication unit 310, an A/V (audio/video) input unit 320, a user input unit 330, a sensing unit 340, an output unit 350, a memory 360, an interface unit 370, a controller 380, a power supply unit 390 and the like. FIG. 10 shows the mobile terminal 100 having various components, but it is understood that implementing all of the illustrated components is not a requirement. Greater or fewer components may alternatively be implemented.

Hereinafter, each component is described in sequence.

The wireless communication unit 310 may typically include one or more components which permit wireless communications between the mobile terminal 100 and a wireless communication system or between the mobile terminal 100 and a network within which the mobile terminal 100 is located. For example, the wireless communication unit 310 may include a broadcast receiving module 311, a mobile communication module 312, a wireless internet module 313, a short-range communication module 314, a position location module 315 and the like.

The broadcast receiving module 311 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 312.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 311 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 311 may be configured to be suitable for every broadcast system transmitting broadcast signals as well as the digital broadcasting systems.

Broadcast signals and/or broadcast associated information received via the broadcast receiving module 311 may be stored in a suitable device, such as a memory 360.

The mobile communication module 312 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 313 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 314 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 315 denotes a module for detecting or calculating a position of a portable terminal. An example of the position location module 115 may include a Global Position System (GPS) module.

The A/V input unit 320 is configured to provide audio or video signal input to the mobile terminal. The A/V input unit 320 may include a camera 321 and a microphone 322. The camera 321 receives and processes image frames of still pictures or video obtained by image sensors in a video (telephony) call mode or a capturing mode. The processed image frames may be displayed on a display unit 123.

The image frames processed by the camera 321 may be stored in the memory 360 or transmitted to the exterior via the wireless communication unit 310. Two or more cameras 321 may be provided according to the configuration of the mobile terminal.

The microphone 322 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 312 in case of the phone call mode. The microphone 322 may include assorted noise removing algorithms to remove noise generated in the course of receiving the external audio signal.

The user input unit 330 may generate input data input by a user to control the operation of the mobile terminal. The user input unit 330 may include a keypad, a dome switch, a touchpad (e.g., static pressure/capacitance), a jog wheel, a jog switch and the like. In the present invention, the user input unit 330 may be used as a device for receiving a grouping command.

The sensing unit 340 provides status measurements of various aspects of the mobile terminal. For instance, the sensing unit 340 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 340 may sense whether a sliding portion of the mobile terminal is open or closed. Other examples include sensing functions, such as the sensing unit 340 sensing the presence or absence of power provided by the power supply 329, the presence or absence of a coupling or other connection between the interface unit 328 and an external device and the like. Moreover, the sensing unit 140 may include a gyro sensor 341 and an acceleration sensor 342.

The output unit 350 is configured to output an audio signal, a video signal or an alarm signal. The output unit 350 may include a display unit 123, an audio output module 352, an alarm 353, a haptic module 354 and the like.

The display unit 123 may output information processed in the mobile terminal 100. For example, when the mobile terminal is operating in a phone call mode, the display unit 123 will provide a User Interface (UI) or a Graphic User Interface (GUI) which includes information associated with the call. Also, the display unit 123 may display various menus and items stored in the memory 360 of the mobile terminal 100. As another example, if the mobile terminal is in a video call mode or a capturing mode, the display unit 123 may additionally or alternatively display images captured and/or received, UI, or GUI.

The display unit 123 may be implemented using at least one of, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface of the display unit 123 may also be implemented to be optically transparent. Under this configuration, a user can view an object positioned at a rear side of a terminal body through a region occupied by the display unit 123 of the terminal body.

The display unit 123 may be implemented in two or more in number according to a configured aspect of the mobile terminal 100. For instance, a plurality of the display units may be arranged on one surface to be spaced apart from or integrated with each other, or may be arranged on different surfaces.

Here, if the display unit 123 and a touch sensitive sensor (referred to as a 'touch sensor') have a layered structure therebetween, the structure may be referred to as 'touch screen'. In this structure, the display unit 123 may be used as an input device rather than an output device. The touch sensor may be implemented as a touch film, a touch sheet, a touch pad, and the like.

The touch sensor may be configured to convert changes of a pressure applied to a specific part of the display unit 123, or a capacitance occurring from a specific part of the display unit 123, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 380.

Accordingly, the controller 380 may sense which region of the display unit 123 has been touched.

The audio output module 352 may output audio data received from the wireless communication unit 310 or stored in the memory 160, in a call-receiving mode, a call-placing mode, a recording mode, a voice recognition mode, a broadcast reception mode, and so on. The audio output module 352 may output audio signals relating to functions performed in the mobile terminal 100, e.g., sound alarming a call received or a message received, and so on. The audio output module 352 may include a receiver, a speaker, a buzzer, and so on.

The alarm 353 outputs signals notifying occurrence of events from the mobile terminal 100. The events occurring from the mobile terminal 100 may include call received, message received, key signal input, touch input, and so on. The alarm 353 may output not only video or audio signals, but also other types of signals such as signals notifying occurrence of events in a vibration manner. Since the video or audio signals can be output through the display unit 123 or the audio output module 352, the display unit 123 and the audio output module 352 may be categorized into a part of the alarm 353.

The haptic module 354 generates various tactile effects which a user can feel. A representative example of the tactile effects generated by the haptic module 354 includes vibration. Vibration generated by the haptic module 354 may have a controllable intensity, a controllable pattern, and so on. For instance, different vibration may be output in a synthesized manner or in a sequential manner.

The haptic module 354 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The memory 360 may store a program for the processing and control of the controller 380. Alternatively, the memory 360 may temporarily store input/output data (e.g., phonebook data, messages, still images, video and the like). Also, the memory 360 may store data related to various patterns of vibrations and audio output upon the touch input on the touch screen.

The memory 360 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 360 on the Internet.

The interface 328 may generally be implemented to interface the mobile terminal with external devices. The interface 328 may allow a data reception from an external device, a power delivery to each component in the mobile terminal 100, or a data transmission from the mobile terminal 100 to an external device. The interface 328 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface 328 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 380 typically controls the overall operations of the mobile terminal 100. For example, the controller 380 performs the control and processing associated with telephony calls, data communications, video calls, and the like. The controller 380 may include a multimedia module 381 which provides multimedia playback. The multimedia module 381 may be configured as part of the controller 380 or as a separate component.

The controller 380 can perform a pattern recognition processing so as to recognize writing or drawing input on the touch screen as text or image.

The power supply unit 329 provides power required by various components under the control of the controller 380. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 380.

For software implementation, the embodiments such as procedures and functions may be implemented together with separate software modules each of which performs at least one of functions and operations. The software codes can be implemented with a software application written in any suitable programming language. Also, the software codes may be stored in the memory 360 and executed by the controller 380.

The configurations and methods of the mobile terminal in the aforesaid embodiments may not be limitedly applied, but such embodiments may be configured by a selective combination of all or part of the embodiments so as to implement many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a first body and a second body;
a rotation module connected to each of the first and second bodies and configured to allow rotation of the first body relative to the second body;
a supporting unit mounted on the first body and in rolling contact with the second body;
wherein the rotation module has a first end connected to the first body and a second end connected to the second body, the rotation module rotatable between the first and second ends,
wherein the rotation module is formed as a cantilever, the first end coupled to the first body defined as a fixed end of the cantilever and the second end coupled to the second body defined as a free end of the cantilever, and
wherein the supporting unit is adjacent to the free end, supports the second body, and is configured to rotate according to the rotation of the first body relative to the second body.

2. The mobile terminal of claim 1, wherein the supporting unit is in linear contact or point contact with the second body.

3. The mobile terminal of claim 2, wherein the supporting unit is further configured to rotate in an opposite direction to the rotation of the second body in order to support the second body.

4. The mobile terminal of claim 1, wherein the supporting unit comprises:
a roller in contact with the second body; and
a roller shaft rotatably mounted on the first body and configured to rotate the roller.

5. The mobile terminal of claim 1, wherein the supporting unit comprises:
a ball in contact with the second body; and
a ball casing mounted on the first body to cover the ball and allow the ball to rotate therein.

6. The mobile terminal of claim 5, wherein at least a portion of the ball casing is open and the ball protrudes through the opening in order to support the second body.

7. The mobile terminal of claim 1, wherein the rotation module comprises a rotational shaft for facilitating the relative rotation between the first and second bodies.

8. The mobile terminal of claim 7, further comprising a display unit configured to display visual information, wherein the a length of the display unit in a direction parallel to the rotational shaft is longer than a length of the display unit in a direction intersecting the rotational shaft.

9. The mobile terminal of claim 1, wherein:
each of the first and second bodies comprises a front surface, the front surface of the first body facing the front surface of the second body when the first and second bodies are overlaid;
each of the first and second bodies comprises a side surface formed in an intersecting direction with the corresponding front surface, the side surface of the first body connected to the side surface of the second body by the rotation module; and
the mobile terminal further comprises a connection unit provided at the side surface of each of the first and second body such that each of the two ends of the rotation module is mounted to one of the connection units.

10. The mobile terminal of claim 9, wherein the supporting unit is mounted on a side surface of the first body.

11. The mobile terminal of claim 1, wherein:
each of the first and second bodies comprises a front surface and a side surface that is formed in an intersecting direction with the corresponding front surface,
the first end of the rotation module is connected to the side surface of the first body; and
the second end of the rotation module is connected to the side surface of the second body.

12. The mobile terminal of claim 11, wherein the side surface of the first body is curved to correspond to an outer circumference of a connection unit of the second body.

13. The mobile terminal of claim 12, wherein at least a connection unit of the first body or the connection unit of the second body comprises:
a body protruding from the corresponding side surface, at least a portion of the body having a circular form; and
an insertion groove recessed into the body in a direction of a rotational shaft of the rotation module, the insertion groove configured to receive the rotational shaft.

14. The mobile terminal of claim 13, wherein the rotation module comprises:
a first bracket located at the first body and configured to receive the rotational shaft;
a second bracket located at the second body and configured to allow insertion of the rotational shaft; and
at least one lubrication member located at an outer circumference of the rotational shaft and configured to fill a gap between the rotational shaft and the first bracket.

15. The mobile terminal of claim 14, wherein the rotation module further comprises a plurality of lubrication members located at positions apart from each other such that at least one of the plurality of lubrication member is adjacent to one end of the rotational shaft and at least another of the plurality of lubrication members is adjacent to another end of the rotational shaft.

16. The mobile terminal of claim 15, wherein:
the connection unit of the first body is located at the side surface of the first body and mounted to the first bracket; and
the connection unit of the second body is located at the side surface of the second body and mounted to the second bracket.

17. The mobile terminal of claim 14, wherein:
the connection unit of the first body is formed as a hollow body to allow the insertion of the first bracket; and
a filling member is provided between the connection unit of the first body and the first bracket, the filling member wrapping up an outer circumference of the first bracket such that a gap between the connection unit of the first body and the first bracket is filled.

18. The mobile terminal of claim 17, wherein
the first bracket has an open end and a blocked end; and
the connection unit and the filling member of the first body are provided with a through hole to which one end of the first bracket is coupled.

19. The mobile terminal of claim 14, wherein the second bracket comprises a coupling unit that is formed in a direction intersecting the rotational shaft and coupled to the second body.

* * * * *